United States Patent
Hibi et al.

(10) Patent No.: US 7,918,511 B2
(45) Date of Patent: Apr. 5, 2011

(54) VEHICLE SEATS

(75) Inventors: Kazuhiro Hibi, Kariya (JP); Ryousuke Ariyoshi, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 133 days.

(21) Appl. No.: 12/390,094

(22) Filed: Feb. 20, 2009

(65) Prior Publication Data

US 2009/0256378 A1 Oct. 15, 2009

(30) Foreign Application Priority Data

Apr. 9, 2008 (JP) ................................. 2008-101112

(51) Int. Cl.
*A47B 97/00* (2006.01)

(52) U.S. Cl. .................. 297/463.1; 297/463.2; 297/182; 297/344.1

(58) Field of Classification Search .................. 297/182, 297/184.1, 463.1, 463.2, 344.1; 296/65.01
See application file for complete search history.

(56) References Cited

U.S. PATENT DOCUMENTS

| 6,871,910 | B2 * | 3/2005 | Hale | 297/330 |
| 7,210,738 | B1 * | 5/2007 | Mahaffy | 297/184.1 |
| 7,316,441 | B2 * | 1/2008 | Iwatani et al. | 296/65.12 |

FOREIGN PATENT DOCUMENTS

| JP | WO2004016461 | * 2/2004 |
| JP | 2004314714 | 11/2004 |

OTHER PUBLICATIONS

Fig. 5 (Prior Art), prior to Feb. 20, 2009.

* cited by examiner

*Primary Examiner* — Anthony D Barfield
(74) *Attorney, Agent, or Firm* — Patterson Thuente Christensen Pedersen, P.A.

(57) ABSTRACT

A vehicle seat may include a longitudinal sliding mechanism having a longitudinal slide base that is arranged and constructed to move back and forth relative to a vehicle floor, and a covering device having a covering member and a wind-up roller that is capable of winding and unwinding the covering member. The covering member is arranged and constructed to cover a substantial portion of the longitudinal sliding mechanism when the longitudinal slide base is moved forwardly. The wind-up roller of the covering device is arranged so as to be positioned forward of a rear end periphery of the longitudinal slide base when the longitudinal slide base is in a farthest rearward position.

3 Claims, 3 Drawing Sheets

VEHICLE SEATS

This application claims priority to Japanese patent application serial number 2008-101112, the contents of which are incorporated herein by reference.

BACKGROUND OF THE INVENTION

1. Field of the Invention

This invention relates to a vehicle seat. More particularly, the present invention relates to a vehicle seat suitable for a welfare vehicle in which an elderly person, a physically handicapped person or other such persons (hereinafter simply referred to as "occupant") is capable of easy getting in and out of a vehicle.

2. Description of Related Art

A conventional vehicle seat includes a seat main body, a longitudinal sliding mechanism that can move or slide the seat main body in forward and rearward directions of a vehicle over a desired distance, a rotation mechanism that can horizontally rotate the seat main body between a forwardly facing position where it faces a front side of a vehicle and a laterally facing position where it faces a door opening of the vehicle, and a lateral sliding mechanism that can move or slide the seat main body moved between vehicle interior and vehicle exterior via the door opening while the seat main body is in the laterally facing position. Generally, the lateral sliding mechanism is arranged and constructed to laterally move the seat main body while the seat main body is moved vertically (i.e., while the seat main body is moved up and down). Further, the longitudinal sliding mechanism, the rotation mechanism and the lateral sliding mechanism are respectively constructed to be actuated electrically or manually. Such a vehicle seat is taught, for example, by Japanese Laid-Open Patent Publication Number 2004-314714.

According to the vehicle seat thus constructed, the seat main body can be moved between vehicle interior and vehicle exterior via the door opening while the seat main body is rotated to the laterally facing position. As a result, an occupant can easily get in and out of the vehicle.

Further, the vehicle seat includes a wind-up type covering device. The covering device is arranged and constructed to cover a drive mechanism and slide rails of the longitudinal sliding mechanism when the seat main body is moved or slid forwardly. In particular, the covering device is disposed on a vehicle floor so as to be positioned behind the longitudinal sliding mechanism. The covering device is composed of a covering member and a retractor that is capable of winding and unwinding the covering member. A free end portion of the covering member is connected to the seat main body, so that the covering member can be automatically pulled out or unwound from the retractor when the seat main body is moved or slid forwardly. The unwound covering member can cover the drive mechanism and the slide rails of the longitudinal sliding mechanism.

According to the covering device, the drive mechanism and the slide rails of the longitudinal sliding mechanism can be effectively hidden from view when the seat main body is moved or slid forwardly. As a result, an interior appearance of the vehicle can be effectively prevented from being deteriorated.

BRIEF SUMMARY OF THE INVENTION

For example, in one aspect of the present invention, a vehicle seat may include a longitudinal sliding mechanism having a longitudinal slide base that is arranged and constructed to move back and forth relative to a vehicle floor, and a covering device having a covering member and a wind-up roller that is capable of winding and unwinding the covering member. The covering member is arranged and constructed to cover a substantial portion of the longitudinal sliding mechanism when the longitudinal slide base is moved forwardly. The wind-up roller of the covering device is arranged so as to be positioned forward of a rear end periphery of the longitudinal slide base when the longitudinal slide base is in a farthest rearward position.

According to the vehicle seat thus constructed, when the longitudinal slide base is moved forwardly, the covering member can be automatically unwound from the wind-up roller, so as to cover the substantial portion of the longitudinal sliding mechanism. Therefore, an interior appearance of the vehicle can be effectively prevented from being deteriorated.

Further, when the longitudinal slide base is in the farthest rearward position thereof, an (unoccupied) space can be formed behind the rear end periphery of the longitudinal slide base. Therefore, a passenger sitting on a rear seat can use the space as a foot space. Thus, the passenger sitting on the rear seat can settle into a comfortable position.

In one embodiment of the present invention, the wind-up roller is applied with a biasing force toward a winding direction, so that the covering member can be unwound from the wind-up roller against the biasing force.

According to this embodiment, the covering member can be unwound from the wind-up roller while it is suitably tensioned. Therefore, the covering member unwound from the wind-up roller may have a good appearance. This may contribute to an increase of the interior appearance of the vehicle.

Other objects, features, and advantages, of the present invention will be readily understood after reading the following detailed description together with the accompanying drawings and the claims.

DETAILED DESCRIPTION OF THE INVENTION

In the following, a detailed representative embodiment of the present invention will be described with reference to FIG. 1 to FIG. 4.

Figure 1:
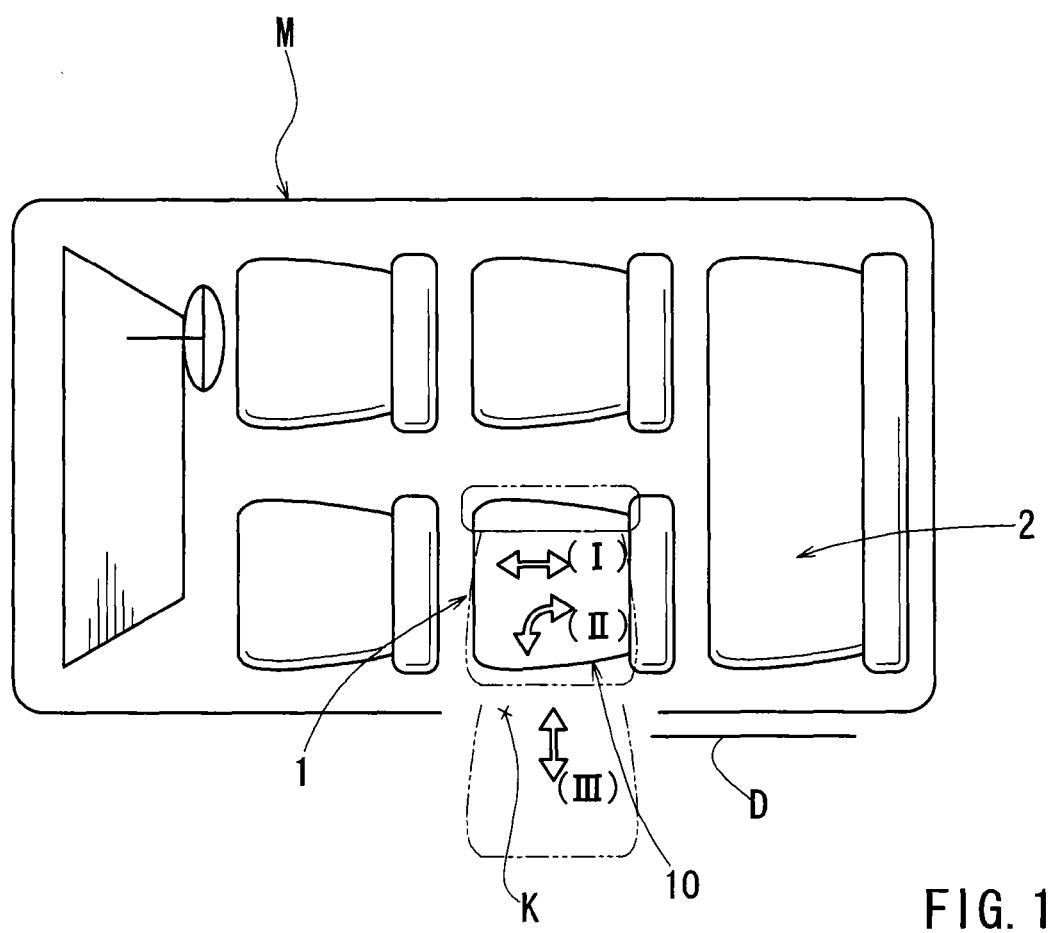
FIG. 1 is a plan view of a vehicle having a vehicle seat according to a representative embodiment of the present invention.

As shown in FIG. 1, a rear (second row) left seat of a vehicle M (a welfare vehicle) is exemplified as a vehicle seat 1 according to the representative embodiment. The vehicle M may preferably have a third row seat that is identified by a reference numeral 2. Further, FIG. 1 shows a condition in which a rear left door D of the vehicle M is opened.

The vehicle seat 1 may preferably include a seat main body 10 that is composed of a seat cushion 11 and a seat back 12. In the vehicle seat 1, the seat main body 10 can move or slide in forward and rearward (longitudinal) directions (shown by an outline arrow I in FIG. 1) of the vehicle M. Further, the seat main body 10 can horizontally move or rotate through an angle of 90 degrees (shown by an outline arrow II in FIG. 1) between a forwardly facing position (shown by solid lines in FIG. 1) where it faces forwardly of the vehicle M and a laterally facing position (shown by broken lines in FIG. 1) where it faces a door opening K of the vehicle M. Further, the seat main body 10 can laterally move or slide in lateral directions (shown by an outline arrow III in FIG. 1) between vehicle interior and vehicle exterior via the door opening K while the seat main body 10 is positioned at the laterally facing position. In addition, in the vehicle exterior, the seat main body 10 can vertically move (i.e., move up and down) between upper and lower positions (not shown) while the seat main body 10 laterally moves. According to the vehicle seat 1, because the seat main body 10 can move to the lower position, a person can easily get in and out of the seat main body 10.

When the person gets out of the vehicle M, the seat main body 10 is moved from the vehicle interior to the vehicle exterior after it is rotated to the laterally facing position in the vehicle interior. Thereafter, the seat main body 10 is moved downwardly toward the lower position such that the person can get out of the seat main body 10. This allows the person to get out of the vehicle M. To the contrary, when the person gets into the vehicle M, the seat main body 10 is moved to the lower position such that the person can get in the seat main body 10. After the person gets in and sits on the seat main body 10, the seat main body 10 is moved in the reverse order. This allows the person to get into the vehicle M.

In order to move the seat main body 10 as described above, as shown in FIG. 2, the vehicle seat 1 may preferably include a longitudinal sliding mechanism 20 disposed on a vehicle floor FL, a rotation mechanism 40 that is disposed on the longitudinal sliding mechanism 20, a vertical moving mechanism (not shown) that is disposed on the rotation mechanism 40, and a lateral sliding mechanism 50 that is disposed on the vertical moving mechanism.

Figure 2:
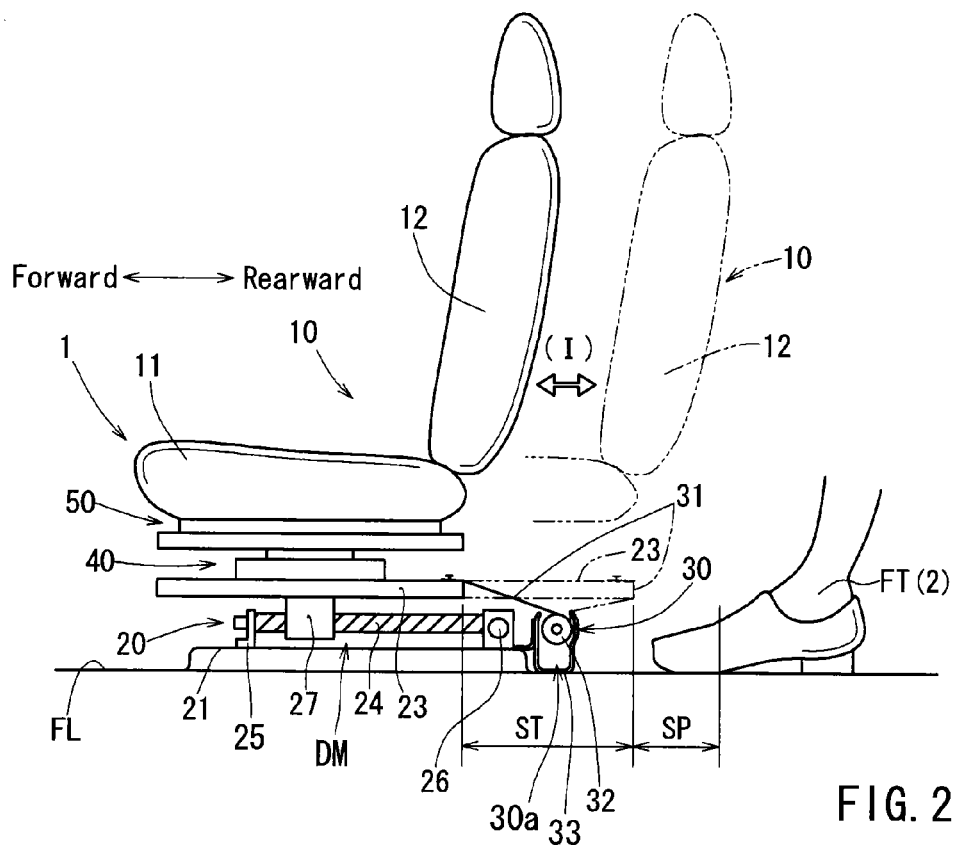
FIG. 2 is a side view of the vehicle seat.
Figure 3:
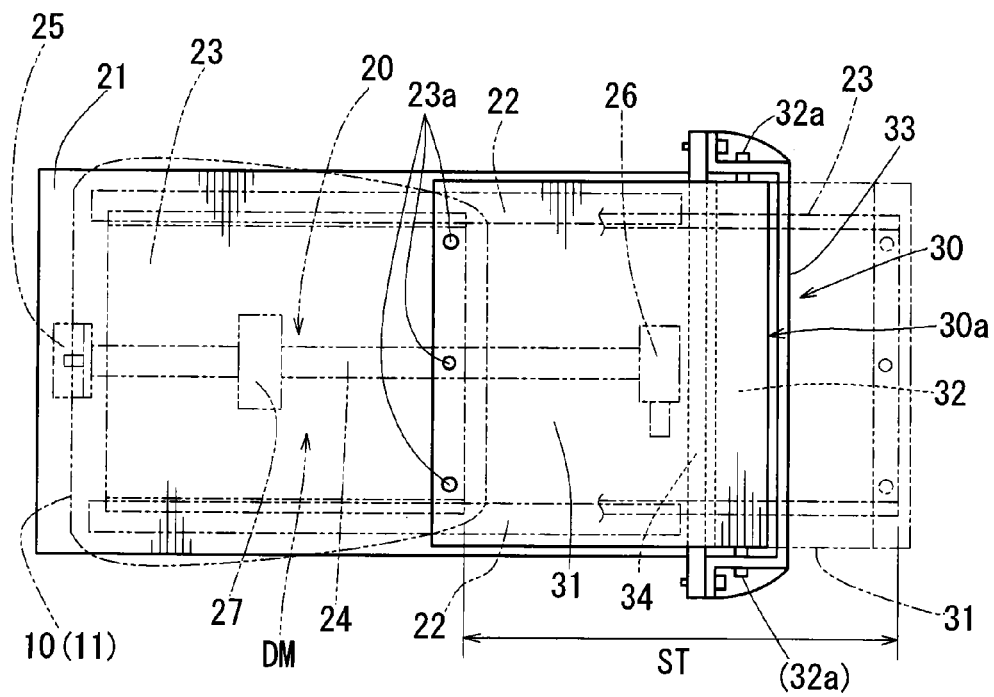
FIG. 3 is a plan view of a longitudinal sliding mechanism and a covering device of the vehicle seat.

The longitudinal sliding mechanism 20 is intended to move the seat main body 10 forward and rearward relative to the vehicle M in the vehicle interior. As shown in FIGS. 2 and 3, the longitudinal sliding mechanism 20 includes a pair of stationary slide rails 22, a longitudinal slide base 23 and a drive mechanism DM as a drive source of the longitudinal sliding mechanism 20. The slide rails 22 are fixedly attached to a main or stationary base 21 (a seat leg) that is mounted on the vehicle floor FL. The slide rails 22 is arranged so as to longitudinally extend in parallel with each other. The longitudinal slide base 23 longitudinally slidably engages the slide rails 22, so as to slide longitudinally (forward and backward) along the slide rails 22 over a predetermined sliding distance ST.

As shown in FIGS. 2 and 3, the drive mechanism DM may preferably include a drive motor 26 that is attached to the stationary base 21, a threaded shaft 24 that is rotatably supported on the stationary base 21 via a support bracket 25, and a nut 27 that is fixedly attached to the longitudinal slide base 23. The threaded shaft 24 may preferably be positioned in parallel with the slide rails 22. One end of the threaded shaft 24 is coaxially coupled to a drive shaft (not shown) of the drive motor 26, so that the threaded shaft 24 can be rotated by the drive motor 26. Further, the threaded shaft 24 threadably engages the nut 27 such that the nut 27 can move along the threaded shaft 24 when the threaded shaft 24 is rotated by the drive motor 26. Therefore, when the drive motor 26 is rotated in normal and reverse directions while it is controlled by a control device (not shown), the longitudinal slide base 23 can move forward and backward relative to the vehicle M along the slide rails 22, so that the seat main body 10 can move in forward and rearward directions. As will be appreciated, the drive mechanism DM is arranged and constructed such that the longitudinal slide base 23 can move along the slide rails 22 over the sliding distance ST, i.e., between a farthest forward position (shown by broken lines in FIG. 2) and a farthest rearward position (shown by solid lines in FIG. 2) thereof.

Figure 4:
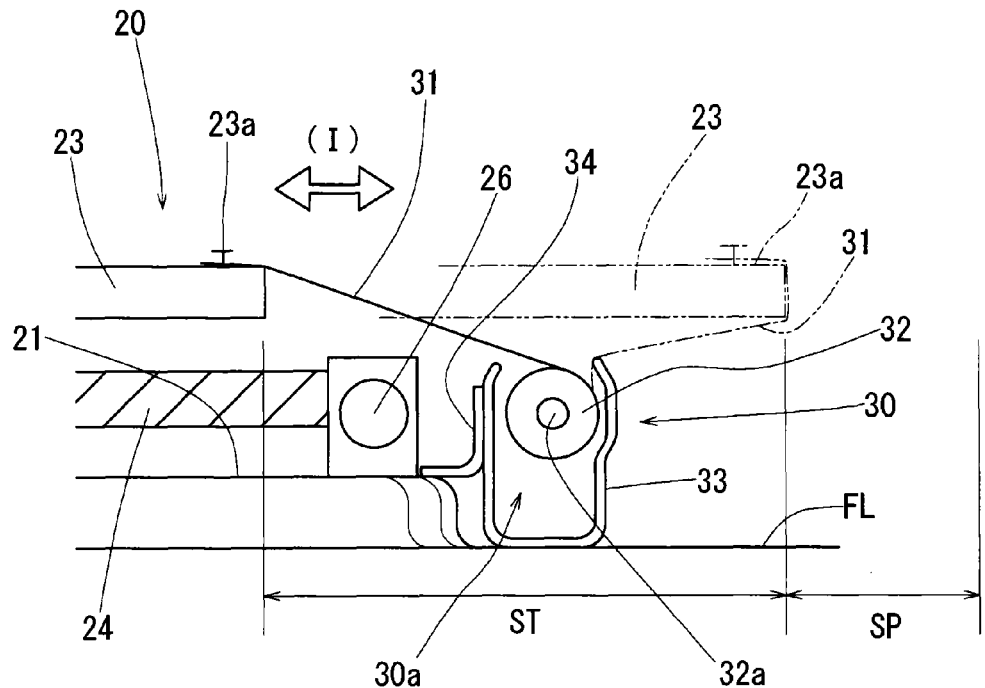
FIG. 4 is a partially enlarged view of FIG. 2.

As shown in FIGS. 2 and 3, the vehicle seat 1 may preferably include a (wind-up type) covering device 30. The covering device 30 is arranged and constructed to cover the drive mechanism DM and the slide rails 22 of the longitudinal sliding mechanism 20 when the longitudinal slide base 23 (the seat main body 10) is slid or moved forwardly. The covering device 30 is composed of a covering member 31 and a retractor 30a that is capable of winding and unwinding the covering member 31. The covering member 31 may preferably be formed from a flexible fabric and have substantially the same width as the longitudinal sliding mechanism 20. As best shown in FIGS. 3 and 4, the retractor 30a includes an elongated housing 33 and an elongated wind-up roller 32. The housing 33 may preferably be shaped such that the covering member 31 can be introduced thereinto. The wind-up roller 32 is positioned in the housing 33 and is rotatably supported thereon via support pins 32a. The covering member 31 is wound around the wind-up roller 32 so as to be normally retracted in the housing 33. As will be recognized, the wind-up roller 32 is normally biased to a winding direction via a torsion coil spring (not shown), so that the covering member 31 can be automatically wound around the wind-up roller 32.

The retractor 30a (the covering device 30) is disposed on a vehicle floor FL so as to be positioned behind the longitudinal sliding mechanism 20 (in particular, behind the drive mechanism DM and the slide rails 22 of the longitudinal sliding mechanism 20). As shown in FIG. 3, the retractor 30a may preferably be transversely positioned such that the housing 33 and the wind-up roller 32 extend in a widthwise direction of the vehicle seat 1 (i.e., in a direction perpendicular to a sliding direction of the longitudinal slide base 23). Further, the retractor 30a may preferably be arranged so as to be positioned under the longitudinal slide base 23 when the longitudinal slide base 23 is in the farthest rearward position thereof. That is, the retractor 30a may preferably be arranged so as to be positioned forward of a rear end periphery of the longitudinal slide base 23 when the longitudinal slide base 23 is in the farthest rearward position thereof. As best shown in FIG. 4, the housing 33 of the retractor 30a thus arranged is fixedly connected to the stationary base 21 via an attachment bracket 34.

As best shown in FIG. 3, a free end portion of the covering member 31 wound around the wind-up roller 32 of the retractor 30a is connected to a rear end upper surface of the longitudinal slide base 23 of the longitudinal sliding mechanism 20 via a plurality of connecting members 23a (e.g., rivets, screws or other such fasteners), so that the covering member 31 can be automatically pulled out from the retractor 30a against a spring force (a biasing force) of the coil spring when the longitudinal slide base 23 (the seat main body 10) is moved or slid forwardly. As best shown in FIG. 4, the pulled out covering member 31 can cover the drive mechanism DM (the threaded shaft 24 and the drive motor 26) and the slide rails 22 of the longitudinal sliding mechanism 20. That is, the pulled out covering member 31 can cover a substantial portion of the longitudinal sliding mechanism 20.

Further, the rotation mechanism 40, the vertical moving mechanism and the lateral sliding mechanism 50 respectively have the same constructions as the conventionally-known mechanisms. Therefore, a detailed description of such mechanisms will be omitted. In addition, the vehicle seat 1 (the seat main body 10) has the same construction as the conventionally-known vehicle seat. Therefore, a detailed description of the vehicle seat 1 will be omitted.

Next, an operation of the vehicle seat 1 thus constructed will be described.

When the drive motor 26 of the drive mechanism DM of the longitudinal sliding mechanism 20 is driven or actuated, the longitudinal slide base 23 can be moved forward and rearward relative to the vehicle M. Thus, the seat main body 10 can be positioned at a desired longitudinal position.

As shown by broken lines in FIGS. 2 and 4, when the longitudinal slide base 23 is in the farthest rearward position thereof, the drive mechanism DM (the threaded shaft 24 and the drive motor 26) and the slide rails 22 of the longitudinal sliding mechanism 20 can be covered by the longitudinal slide base 23. Conversely, as shown by solid lines in FIGS. 2 and 4, when the longitudinal slide base 23 is moved forward from the farthest rearward position thereof upon actuation of the drive motor 26 of the drive mechanism DM of the longitudinal sliding mechanism 20, the covering member 31 can be automatically unwound (pulled out) from the wind-up roller 32 of the retractor 30a against the spring force of the coil spring. As a result, the drive mechanism DM (the threaded shaft 24 and the drive motor 26) and the slide rails 22 of the longitudinal sliding mechanism 20 can be covered by the sliding member 31. Thus, an interior appearance of the vehicle M can be effectively prevented from being deteriorated.

According to the present embodiment, when the longitudinal slide base 23 is in the farthest rearward position thereof, the retractor 30a can be positioned under the longitudinal slide base 23. That is, when the longitudinal slide base 23 is in the farthest rearward position thereof, the retractor 30a can be positioned forward of the rear end periphery of the longitudinal slide base 23. Therefore, as shown in FIGS. 2 and 4, when the longitudinal slide base 23 is in the farthest rearward position thereof, an (unoccupied) space SP can be formed behind the rear end periphery of the longitudinal slide base 23. As a result, as shown in FIG. 2, a passenger sitting on the third row seat 2 can use the space SP as a foot space. That is, the passenger can put his/her feet FT within the space SP. Thus, the passenger sitting on the third row seat 2 can be comfortably positioned.

Figure 5:
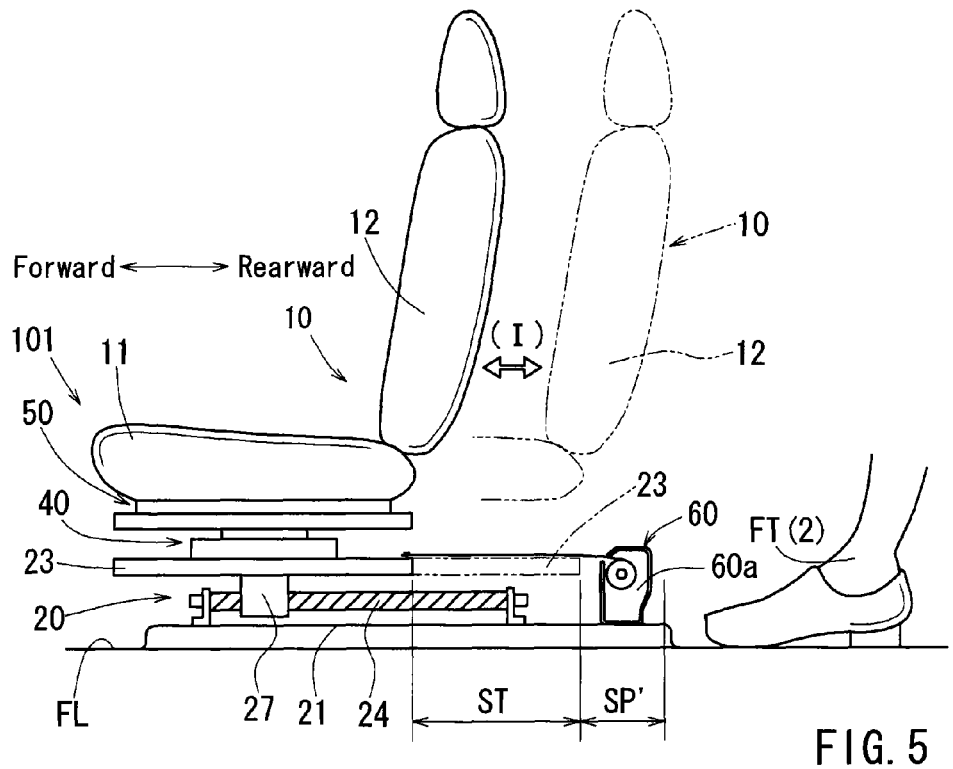
FIG. 5 is a view similar to FIG. 2, which illustrates a conventional vehicle seat.

To the contrary, as shown in FIG. 5, in a conventional vehicle seat 101, a retractor 60a (a covering device 60) corresponding to the retractor 30a (the covering device 30) of the present embodiment is disposed on the vehicle floor FL so as to be positioned behind the longitudinal sliding mechanism 20. However, unlike the retractor 30a of the present embodiment, the retractor 60a is not arranged so as to be positioned under the longitudinal slide base 23 when the longitudinal slide base 23 is in the farthest rearward position thereof. That is, the retractor 60a is arranged so as to be positioned rearward of the rear end periphery of the longitudinal slide base 23 when the longitudinal slide base is in the farthest rearward position thereof.

According to the conventional vehicle seat 101, when the longitudinal slide base 23 is in the farthest rearward position thereof, the retractor 60a can be positioned rearward of the rear end periphery of the longitudinal slide base 23. Therefore, as shown in FIG. 5, when the longitudinal slide base 23 is in the farthest rearward position thereof, a space SP' that is occupied by the retractor 60a (the covering device 60) can be formed behind the rear end periphery of the longitudinal slide base 23. As a result, the passenger sitting on the third row seat 2 cannot use the space SP' as the foot space. That is, the passenger cannot put his/her feet FT on the space SP'. Thus, the passenger sitting on the third row seat 2 cannot settle into the comfortable position.

Further, according to the present embodiment, the longitudinal slide base 23 can move or slide above the retractor 30a (the covering device 30). Therefore, the longitudinal sliding mechanism 20 can be easily modified such that the sliding distance ST of the longitudinal slide base 23 can be increased (i.e., such that the farthest rearward position of the longitudinal slide base 23 can be considerably shifted rearwardly). According to the vehicle seat 1 having the longitudinal sliding mechanism 20 thus modified, a passenger sitting on the vehicle seat 1 can freely settle into the comfortable position.

Various changes and modifications may be made to the present invention without departing from the scope of the previously shown and described embodiment. For example, the representative embodiment exemplifies the vehicle seat 1 having the rotation mechanism 40, the vertical moving mechanism and the lateral sliding mechanism 50 as well as the longitudinal sliding mechanism 20. However, the vehicle seat 1 can be replaced with various vehicle seats having the longitudinal sliding mechanism 20. That is, the present invention can be applied to vehicle seats other than the vehicle seat 1 suitable for the welfare vehicle.

Further, in the embodiment, the free end portion of the covering member 31 is connected to the rear end upper surface of the longitudinal slide base 23. However, the free end portion of the covering member 31 can be connected to a rear end edge surface or a rear end lower surface of the longitudinal slide base 23, if necessary.

Further, the retractor 30a (the covering device 30) can be moved back and forth on the vehicle floor FL, provided that the retractor 30a can substantially be positioned under the longitudinal slide base 23 when the longitudinal slide base 23 is in the farthest rearward position thereof.

Further, in the embodiment, the retractor 30a is disposed on the vehicle floor FL. However, the retractor 30a can be disposed on the longitudinal slide base 23, if necessary. In such a case, the free end portion of the covering member 31 may preferably be connected to the vehicle floor FL.

Moreover, the rear (second row) left seat is exemplified as the vehicle seat 1. However, the vehicle seat 1 may be a front passenger seat or a rear (second row) right seat.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Additional examples of relevant vehicle seats are found in U.S. patent application Ser. No. 12/046,191, the contents of which are hereby incorporated by reference.

What is claimed is:

1. A vehicle seat, comprising:
    a longitudinal sliding mechanism having a longitudinal slide base that is arranged and constructed to move back and forth relative to a vehicle floor;
    a covering device having a covering member and a wind-up roller that is capable of winding and unwinding the covering member, and
    a seat body having a seat cushion and being disposed on the longitudinal slide base, wherein the covering member is arranged and constructed to be unwound forwardly from the wind-up roller when the longitudinal slide base is moved forwardly, so as to cover a portion of the longitudinal sliding mechanism which portion is not covered by the longitudinal slide base, wherein the wind-up roller of the covering device is applied with a biasing force toward a winding direction, so that the covering member can be unwound from the wind-up roller against the biasing force, wherein the covering device is arranged so as to be positioned forward of a rear end periphery of the longitudinal slide base when the longitudinal slide base is in a farthest rearward position, and wherein the covering device is arranged so as to be positioned under the longitudinal slide base while the covering member is unwound rearwardly from the wind-up roller when the longitudinal slide base is in the farthest rearward position.

2. The vehicle seat as defined in claim 1, wherein the covering member is connected to the longitudinal slide base, so as to be automatically unwound from the 30 wind-up roller when the longitudinal slide base is moved forwardly.

3. The vehicle seat as defined in claim 1, wherein the covering device is arranged so as to be positioned under the seat cushion disposed on the longitudinal slide base when the longitudinal slide base is in the farthest rearward position.

* * * * *